United States Patent
Spillner et al.

[11] Patent Number: 5,851,006
[45] Date of Patent: Dec. 22, 1998

[54] TORSIONAL ELEMENT FOR STEERING VALVES AND SPRING CHARACTERISTIC IMPROVING PROCESS

[75] Inventors: Robert Spillner; Lars Hampe, both of Düsseldorf, Germany

[73] Assignee: TRW Fahrwerksysteme GmbH & Co. KG, Dusseldorf, Germany

[21] Appl. No.: 776,883

[22] PCT Filed: Jun. 18, 1996

[86] PCT No.: PCT/EP96/02614

§ 371 Date: Apr. 25, 1997

§ 102(e) Date: Apr. 25, 1997

[87] PCT Pub. No.: WO97/00189

PCT Pub. Date: Jan. 3, 1997

[30] Foreign Application Priority Data

Jun. 12, 1995 [DE] Germany .................. 195 21 567.2

[51] Int. Cl.$^6$ ............................... B62D 5/06; F16D 3/72
[52] U.S. Cl. .................. 267/273; 74/388 PS; 91/375 A; 180/417; 180/441
[58] Field of Search .................... 267/154, 273, 267/277; 91/375 A; 74/388 PS, 411; 180/417, 421, 422, 423, 441

[56] References Cited

U.S. PATENT DOCUMENTS

| | | | |
|---|---|---|---|
| 4,774,847 | 10/1988 | Breitweg | 267/273 |
| 5,571,238 | 11/1996 | Bretiweg et al. | 91/375 A |
| 5,687,810 | 11/1997 | Chol et al. | 91/375 A |
| 5,697,400 | 12/1997 | Pfeifer | 91/375 A |
| 5,707,049 | 1/1998 | Dodak | 267/273 |

FOREIGN PATENT DOCUMENTS

| | | |
|---|---|---|
| 0244449 | 3/1990 | European Pat. Off. . |
| 0621168 | 10/1994 | European Pat. Off. . |
| 4238312 | 5/1994 | Germany . |
| WO94/11646 | 5/1994 | WIPO . |

*Primary Examiner*—Robert Oberleitner
*Assistant Examiner*—Chris J. Schwartz
*Attorney, Agent, or Firm*—Tarolli, Sundheim, Covell Tummino & Szabo

[57] ABSTRACT

A torsion element (1) for a steering valve is provided. The torsion element (1) comprises a torsionally elastic rod member (2) having axially opposite first and second end areas (3, 4) which are rotatable relative to one another. The rod member (2) has a circumferentially spaced plurality of radially and axially extending indentations (10) adjacent the second end area. A generally tubular, torsionally stiff sleeve member (6) encircles the rod member (2) and is fixedly attached to the first end area (4) of the rod member. The sleeve member (6) includes a circumferentially spaced plurality of radially and axially extending grooves (9) which align with and radially overlie the plurality of indentations (10) in a neutral steering condition. The sleeve member (6) further includes a circumferentially spaced plurality of radial slots (7). The plurality of grooves (9) cooperates with the plurality of indentations (10) to exert a radially directed centering force on the rod member (2) upon rotation of one of the end areas (3, 4) of the rod member from the neutral steering condition.

3 Claims, 2 Drawing Sheets

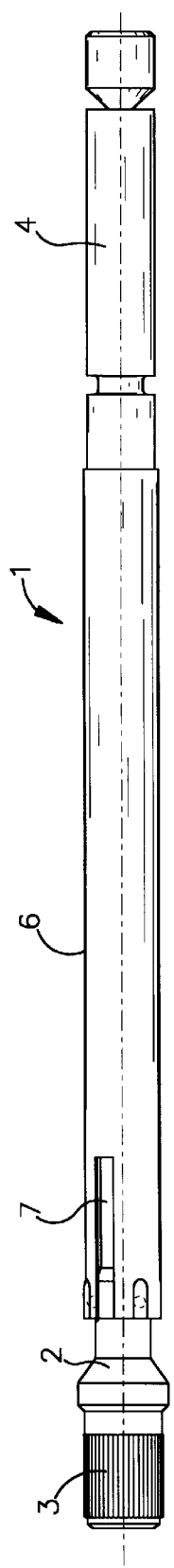
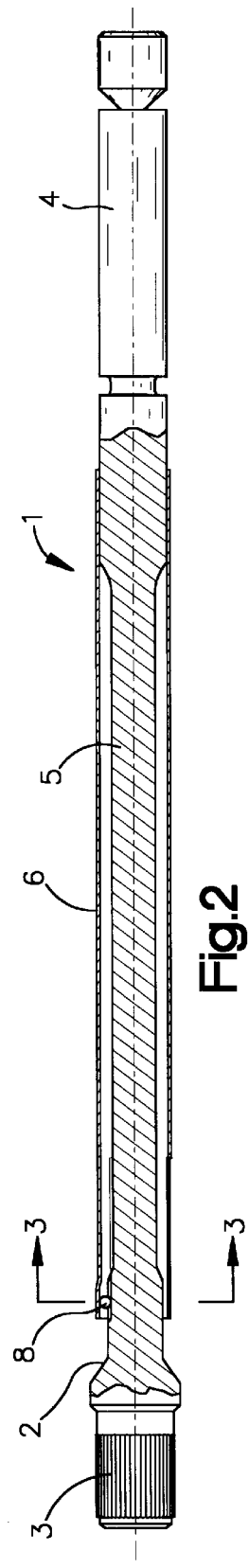
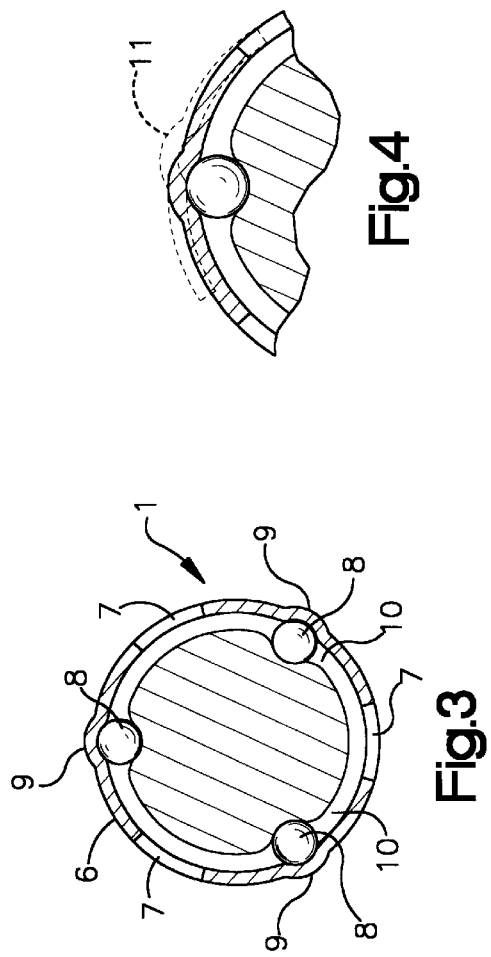
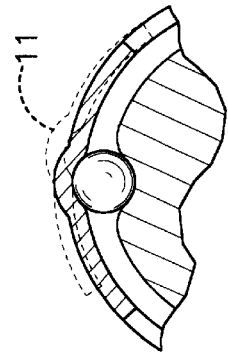

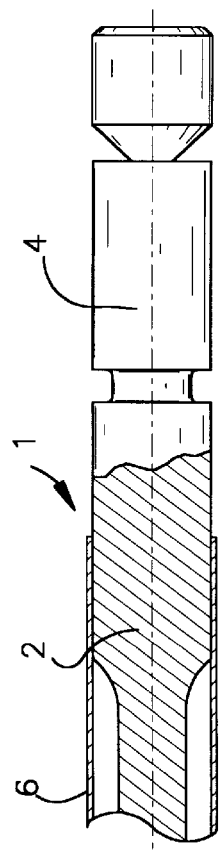
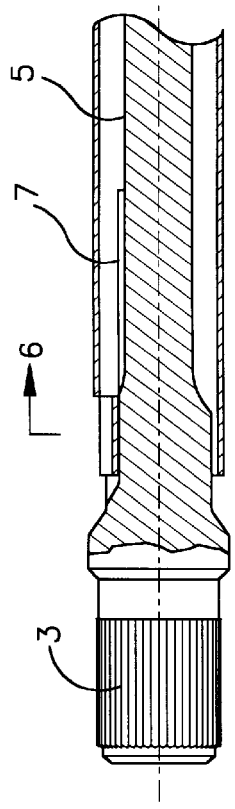
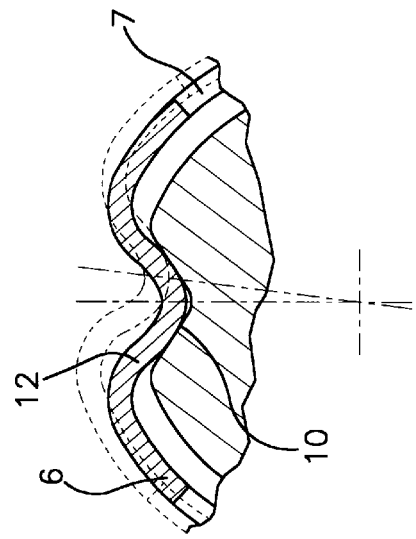

5,851,006

TORSIONAL ELEMENT FOR STEERING VALVES AND SPRING CHARACTERISTIC IMPROVING PROCESS

BACKGROUND OF THE INVENTION

The invention pertains to a method for improving the spring characteristic of a torsion element for steering valves in power steering systems for motor vehicles, wherein said torsion element comprises two fastening end areas and at least one torsional area. The invention also discloses a new torsion element.

Steering valves of the aforementioned type are, in particular, used in power steering systems. An input shaft that is connected to a steering rod hydraulically cooperates with a valve sleeve that surrounds the input shaft and is connected to an output shaft with a pinion. The pinion of the output shaft acts upon the toothed rack of the steering system. Hydraulic fluid is pumped through the system under low pressure by means of a pump. If the input shaft is turned relative to the valve sleeve, hydraulic pressure is supplied to a hydraulic motor that boosts the movement of the toothed rack in one of the two possible directions. The input shaft and the output shaft are connected to one another via an elastic torsion element, preferably a torsion rod, in order to generate a certain torsional stiffness. A reaction device that can be charged with pressure may be arranged in the system in order to generate an additional centering moment. A reaction piston that is prestressed by a compression spring and, for example, may be additionally charged with hydraulic pressure as a function of the speed is usually used for this purpose, with the additional hydraulic pressure varying the torsional moment that must be overcome in order to turn the input shaft relative to the valve sleeve as a function of the speed. Known reaction pistons of this type are fixed relative to the input shaft in rotationally rigid fashion by means of balls that are guided in longitudinal grooves arranged in the input shaft. In addition, the reaction piston is prestressed in the direction toward the valve sleeve by means of a compression spring. If a torsional moment is exerted upon the input shaft, said torsional moment is converted into an axial force via the reaction piston and a ball coupling, with the axial force acting against the force of the spring that acts upon the reaction piston. As soon as this axial force generated by the ball coupling exceeds the counteracting spring force, the reaction piston is moved away from the valve sleeve axially, and the input shaft can be turned relative to the valve sleeve. A variation in the torsional moment can be realized by adjusting a corresponding hydraulic pressure on the side of the reaction piston which is situated opposite to the spring.

If a reaction piston that is charged with pressure via a coil spring is used for centering purposes, the resulting prestress of the reaction piston depends on the quality of the valve preassembly. The spring prestress to be adjusted varies within an undesirably broad range. In addition, the spring force acting upon the reaction piston is not concentric due to the utilization of a coil spring. This leads to distortions of the valve, which manifest themselves in the form of several complications, e.g., input shaft friction and hysteresis problems.

In addition to the previously described disadvantages, e.g., the difficult mechanical adjustment, the high expenditure of components and, if the reaction piston is charged with pressure, a difficult hydraulic seal, the main disadvantage of previously known steering valves of this type can be seen in the fact that the structural size, in particular, the structural length, cannot be reduced due to the reaction elements that essentially act in the axial direction.

In another known method, a metal bellows that is torsionally stiff but axially elastic is used instead of coil springs. Such a metal bellows makes it possible to attain a defined moment by means of a preadjustment during its assembly.

All described systems have the disadvantage that various elements must be mounted and centered or hydraulically balanced relative to one another at different locations.

A centering device of this type is, for example, known from EP 0244449 B1. In order to prevent the assembly of the individual components at different locations and, in particular, ensure the required space in the axial direction as well as an exactly centered adjustment, this document proposes a centering device that consists of two connecting parts which are connected via a torsion rod in the interior and comprise a ball coupling that cooperates with a metal bellows within the outer circumferential area. If this device is used as a component for a power steering valve, adjustable centering moments can be realized.

One disadvantage of this previously known device can be seen in the large number of required components that not only must be assembled independently of one another but also adjusted relative to one another. Additional disadvantages result from the relatively large outer diameter of the metal bellows as well as the high price. This previously known device functions in such a way that a rotational movement is transformed into an axial movement.

EP 0621168 A1 discloses an alternative device in which the torsion rod is surrounded by a tube with a different spring characteristic. The rotational forces are transformed into tangential forces by means of a C spring system. This causes the sleeve that surrounds the torsion rod to carry out an eccentric excursion. This additional moment, which results from the restoring force, serves centering purposes and improves the response behavior. This previously known device is also quite complicated due to the large number of required components, namely because said components need to be assembled independently of one another and adjusted relative to one another. In addition, the structural design does not allow a miniaturization of this device.

SUMMARY OF THE INVENTION

Originating from this state of the art, the present invention is based on the objective of disclosing a method for improving the spring characteristic of such a torsion element that can be inexpensively realized and, in particular, simplifies and improves the centering force without high expenditures. In addition, the invention discloses a new type of torsion element.

In order to attain this objective, the invention proposes a method for improving the spring characteristic of a torsion element for a steering valve that comprises two fastening end areas and at least one torsional area. This method is characterized by the fact that both fastening end areas are connected via an essentially torsionally stiff supplementary element that is arranged in at least one fastening end area such that it can be turned relative to the torsion element as a function of the force of an elastic element that essentially acts in the radial direction.

In the arrangement according to the invention, a torsion element, preferably a torsion rod, and an essentially torsionally stiff supplementary element are combined, with the essentially torsionally stiff supplementary element being prestressed relative to the torsion element in the radial direction. Consequently, the rotational movement is transformed into a radial force. In contrast to previously known transformations of rotational forces into axial or tangential forces, the transformation according to the invention is simplified greatly. This means that the ability to adjust the components and the utilization of the method according to the invention are also significantly simplified. A centering moment that depends only on the spring constant of the elastic element that acts in the radial direction can be exerted directly, i.e., without excessive deviations or transformations. This solution also allows a miniaturization of the torsion element.

According to one advantageous proposal, the two fastening end areas of the torsion element are connected to one another via a sleeve element. This connection is realized within at least one fastening end area, preferably by means of pressing. It is advantageously proposed that balls are intermediately arranged in the connection between the supplementary element and the torsion element. According to one particularly advantageous proposal, the balls are inserted into grooves in at least one of the two elements.

According to one particularly advantageous proposal, the elastic element is arranged directly in the supplementary element. This can, for example, be realized by slotting the end area of the supplementary element. The end area of the supplementary element can be radially prestressed relative to the torsion element with simple means and realized elastically.

The invention proposes a simple method that eliminates excessive deflections of forces and utilizes a simple transformation of the rotational force into a radial force. Due to these measures, complicated transformation gears can be eliminated.

The invention also pertains to a particularly advantageous torsion element for a steering valve that comprises two fastening end areas and at least one torsional area. This torsion element is characterized by the fact that it comprises an essentially torsionally stiff supplementary element that connects the two fastening end areas to one another and is arranged in at least one fastening end area such that it can be turned relative to the torsion element as a function of the force of an elastic element that essentially acts in the radial direction.

The proposed torsion element can be miniaturized and the spring characteristics of the torsion element are improved with respect to the centering function due to the properties of the elastic element, which are combined with the elasticity of the torsion element.

According to one particularly advantageous proposal, the supplementary element consists of a tubular sleeve. According to one proposal of the invention, this sleeve can be pressed into one fastening end area of the torsion rod. The other end of the sleeve may be provided with axially extending slots such that elastic tube surfaces are attained within the area of the face edge. According to one advantageous proposal, balls may be arranged between the supplementary element and the torsion element within the rotatable end area, preferably in grooves arranged in the torsion rod and/or in grooves arranged in the sleeve.

Consequently, the torsion element according to the invention causes the essentially torsionally stiff sleeve and consequently the radially elastic fastening end to be initially subjected to a load once a rotational movement is exerted upon the torsion rod that is customarily connected to an input shaft and an output shaft. Due to the torsional force, an opposing force is exerted upon the elastic element that acts in the radial direction, namely until this force is overcome and a rotation or torsion of the torsion rod is possible. This rotation or torsion of the torsion rod exclusively depends on its elasticity.

The invention discloses a simple and extremely effective device that can be inexpensively manufactured, retrofitted and miniaturized.

BRIEF DESCRIPTION OF THE DRAWINGS

Additional advantages and characteristics of the invention are disclosed below with reference to the figures. The figures show:

FIG. 1: a schematic representation of one embodiment of the invention;

FIG. 2: a partially sectioned representation of the embodiment shown in FIG. 1;

FIG. 3: a sectional representation along the line A—A in FIG. 2;

FIG. 4: a schematic representation of the embodiment shown in FIG. 3 in an excursion position;

FIG. 5: a schematic representation of one additional embodiment of the invention;

FIG. 6: a sectional representation along the line A—A in FIG. 5, and

FIG. 7: a schematic representation of the embodiment shown in FIG. 6 in an excursion position.

DETAILED DESCRIPTION OF THE PREFERRED EMBODIMENTS

FIGS. 1–4 show a first embodiment. The centering device in the form of a torsion element 1 consists of a torsion rod 2 that comprises fastening areas 3 and 4 in the embodiment shown. The torsion rod 2 is customarily connected to an output shaft with one fastening area, e.g., the area 3, and connected to an input shaft with the other fastening area 4. The torsion rod 2 has a torsional area 5 between the fastening areas 3 and 4. A force exerted upon the torsion rod via the input shaft initially causes the two ends 3 and 4 to be turned relative to one another due to the torsional elasticity of the torsion rod 2.

In the embodiment shown, the torsion rod 2 is surrounded by a sleeve 6 that is connected to the torsion rod 2 in the respective fastening areas 3 and 4, i.e., on the ends of the torsional area 5. On the side of the fastening area 4, the sleeve 6 is connected to the torsion rod 2 such that said components cannot be turned relative to one another, e.g., by means of pressing. Within the area of the fastening end 3, the sleeve 6 can be turned relative to the torsion rod 2. For this purpose, the sleeve 6 is provided with slots 7 within its end area. Consequently, one attains end pieces that have a radial elasticity. In the embodiment shown, the elastic end pieces are provided with grooves 9 that are situated opposite to grooves 10 arranged in the torsion rod 2 (FIG. 3). Balls 8 are inserted into the pairs of grooves 9, 10. FIG. 4 clearly shows the resultant maximum excursion. If the fastening area 4 is turned relative to the fastening area 3, the sleeve 6 that does not have torsionally elastic properties is also turned and counteracts the radial elasticity of the slotted end areas because the balls 8 are turned out of the pair of grooves 9,10 due to the aforementioned turning of one fastening area relative to the other fastening area. Consequently, the elasticity of the end pieces of the sleeve 6 is combined with the torsional elasticity of the torsion rod 2.

FIGS. 5–7 show one additional embodiment. Identical components are identified by the same reference numerals as in FIGS. 1–4. The torsion element 1 comprises the torsion rod 2 with the fastening areas 3 and 4. The torsional area 5 is surrounded by the sleeve 6 arranged on the fastening areas. On the side of the fastening area 4, this sleeve is connected to the torsion rod 2 such that said components cannot be turned relative to one another, e.g., by means of pressing. Within the area of the fastening end 3, the sleeve 6 can be turned relative to the torsion rod 2. In this embodiment, the sleeve that also comprises slots 7 within the end area such that radially elastic end pieces are attained is inserted into grooves 10 in the torsion rod by means of notches 12. Consequently, it is not necessary to intermediately arrange additional elements, e.g., balls or the like. FIG. 7, in particular, shows how the elasticity of the end pieces of the sleeve 6 causes a centering force due to the notch 12 that moves along the groove 10 if a torsional moment is exerted upon the torsion rod via the input shaft.

Having described the invention, we claim:

1. A torsion element for a steering valve, said torsion element comprising:

a torsionally elastic rod member having axially opposite first and second end areas which are rotatable relative to one another, said rod member having a circumferentially spaced plurality of radially and axially extending indentations adjacent said second end area; and a generally tubular, torsionally stiff sleeve member encircling said rod member, said sleeve member having axially opposite first and second end portions, said first end portion being fixedly attached to said first end area of said rod member, said second end portion of said sleeve member including a circumferentially spaced plurality of radially and axially extending grooves which align with and radially overlie said plurality of indentations in said rod member in a neutral steering condition, said second end portion of said sleeve member further including a circumferentially spaced plurality of radial slots which extend axially in parallel with said plurality of grooves in said second end portion, said plurality of slots being circumferentially spaced between said plurality of grooves, said plurality of grooves in said sleeve member cooperating with said plurality of indentations in said rod member to exert a radially directed centering force on said rod member upon rotation of one of said end areas of said rod member from the neutral steering condition, the magnitude of the centering force being preset by said plurality of slots in said sleeve member.

2. The torsion element of claim 1 further comprising a plurality of balls disposed between said rod member and said sleeve element, a respective one of said plurality of balls being located in a respective one of said plurality of indentations in said rod member and in a respective one of said plurality of grooves which radially overlies said one of said plurality of indentations.

3. The torsion element of claim 1 wherein each of said plurality of grooves in said sleeve member extends radially inward into engagement with a respective one of said plurality of indentations in said rod member.

* * * * *